(12) United States Patent
Yoshitomi et al.

(10) Patent No.: US 10,808,828 B2
(45) Date of Patent: Oct. 20, 2020

(54) OIL SUPPLY STRUCTURE FOR PLANETARY GEAR DEVICE

(71) Applicant: KAWASAKI JUKOGYO KABUSHIKI KAISHA, Kobe-shi, Hyogo (JP)

(72) Inventors: Mamoru Yoshitomi, Akashi (JP); Hirofumi Akahori, Akashi (JP); Tooru Nishida, Akashi (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 147 days.

(21) Appl. No.: 15/748,255

(22) PCT Filed: Jul. 27, 2016

(86) PCT No.: PCT/JP2016/003483
§ 371 (c)(1),
(2) Date: Jan. 29, 2018

(87) PCT Pub. No.: WO2017/022213
PCT Pub. Date: Feb. 9, 2017

(65) Prior Publication Data
US 2018/0216722 A1   Aug. 2, 2018

(30) Foreign Application Priority Data
Jul. 31, 2015   (JP) .................. 2015-151725

(51) Int. Cl.
*F16H 57/04*   (2010.01)
*F16J 15/18*   (2006.01)
(Continued)

(52) U.S. Cl.
CPC ............. *F16H 57/043* (2013.01); *F16H 1/28* (2013.01); *F16H 57/04* (2013.01);
(Continued)

(58) Field of Classification Search
CPC ...... F16H 57/043; F16H 1/28; F16H 57/0479; F16J 15/32; F16J 15/3268; F16J 15/447; F16J 15/002
See application file for complete search history.

(56) References Cited

U.S. PATENT DOCUMENTS

| 8,636,615 B2 * | 1/2014 | Suzuki | F16H 57/0486 475/159 |
| 2009/0088282 A1 * | 4/2009 | Iwasaki | F16H 3/66 475/159 |

(Continued)

FOREIGN PATENT DOCUMENTS

| EP | 2752593 A1 | 7/2014 |
| WO | 2011/129110 A1 | 10/2011 |

*Primary Examiner* — Stacey A Fluhart
(74) *Attorney, Agent, or Firm* — Sughrue Mion, PLLC (57) ABSTRACT

An oil supply structure for a planetary gear device includes: a planetary gear device including a tubular body that rotates together with a carrier that holds planetary gears, the tubular body including a lubricating oil introduction port formed therein; an annular body that slides against the tubular body, the annular body including a lubricating oil supply passage that communicates with the lubricating oil introduction port; a pair of seal rings attached to the tubular body or the annular body at both sides of the lubricating oil introduction port in an axial direction; bypass passages bypassing the pair of respective seal rings; and a pair of pressure reduction mechanisms disposed between the lubricating oil introduction port and the pair of seal rings or disposed outside the pair of seal rings, the pair of pressure reduction mechanisms each limiting a flow of lubricating oil between the tubular body and the annular body.

17 Claims, 7 Drawing Sheets

(51) Int. Cl.
    *F16J 15/447*     (2006.01)
    *F16H 1/28*     (2006.01)
    *F16H 57/08*     (2006.01)

(52) U.S. Cl.
    CPC ..... *F16H 57/0435* (2013.01); *F16H 57/0479* (2013.01); *F16H 57/0486* (2013.01); *F16H 57/082* (2013.01); *F16J 15/18* (2013.01); *F16J 15/447* (2013.01)

(56) References Cited

U.S. PATENT DOCUMENTS

| | | | |
|---|---|---|---|
| 2013/0095974 A1* | 4/2013 | Imai | F16H 57/0479 475/159 |
| 2016/0069212 A1* | 3/2016 | McCune | F16H 57/0479 475/159 |
| 2016/0238125 A1* | 8/2016 | Hidding | F16H 1/48 |
| 2016/0363211 A1* | 12/2016 | Bradley | F02C 3/04 |

\* cited by examiner

OIL SUPPLY STRUCTURE FOR PLANETARY GEAR DEVICE

CROSS REFERENCE TO RELATED APPLICATIONS

This application is a National Stage of International Application No. PCT/JP2016/003483 filed Jul. 27, 2016, claiming priority based on Japanese Patent Application No. 2015-151725 filed Jul. 31, 2015, the contents of all of which are incorporated herein by reference in their entirety.

TECHNICAL FIELD

The present invention relates to an oil supply structure for supplying lubricating oil to a planetary gear device.

BACKGROUND ART

In a planetary gear device, rotating planetary gears revolve around a sun gear. Lubricating oil is supplied to the bearings of the planetary gears through a lubricating oil passage formed in a carrier that holds the planetary gears.

Figure 7:
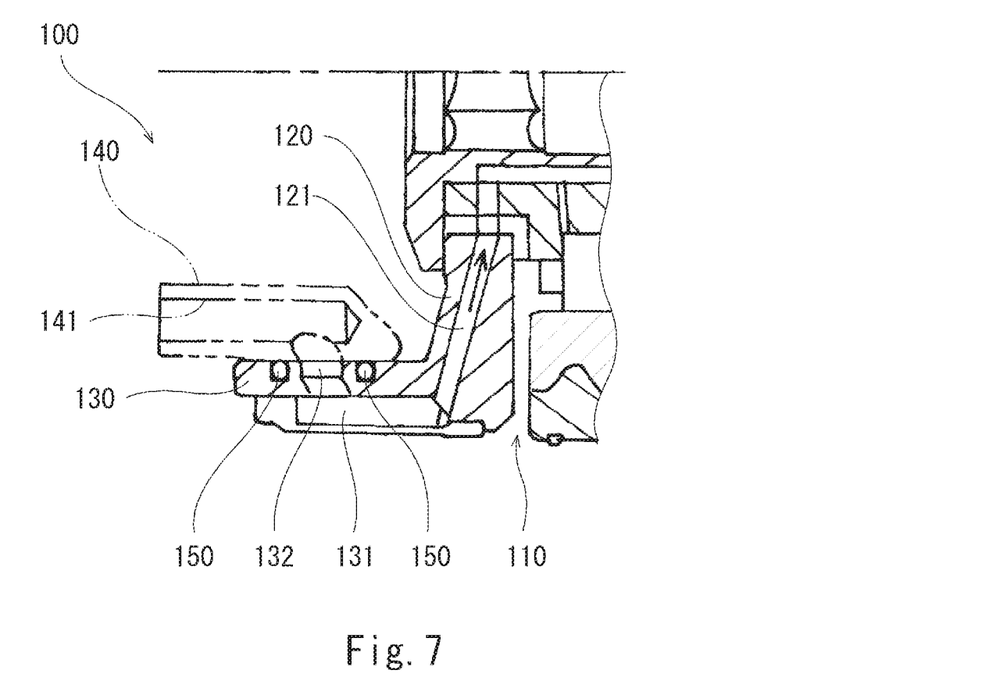
FIG. 7 is a sectional view of a tubular body and an annular body in a conventional oil supply structure for a planetary gear device.

For example, Patent Literature 1 discloses an oil supply structure 100 for a planetary gear device as shown in FIG. 7. In the oil supply structure 100, a planetary gear device 110 includes: a carrier 120, in which a lubricating oil passage 121 is formed; and a tubular body 130 provided at the radially inner end of the carrier 120. A lubricating oil introduction passage 131, which communicates with the lubricating oil passage 121, is formed in the tubular body 130. A lubricating oil introduction port 132 is formed in the outer peripheral surface of the tubular body 130.

The outer peripheral surface of the tubular body 130 slides against the inner peripheral surface of an annular body 140. A lubricating oil supply passage 141, which communicates with the lubricating oil introduction port 132, is formed in the annular body 140. A pair of seal rings 150 is attached to the tubular body 130 at both sides of the lubricating oil introduction port 132 in the axial direction of the planetary gear device.

CITATION LIST

Patent Literature

PTL 1: WO 2011/129110

SUMMARY OF INVENTION

Technical Problem

In a case where the pressure of the lubricating oil is high or the peripheral speed is fast, the PV value is high. For this reason, the seal rings cannot be used. In such a case, it is conceivable to use gap seals or labyrinth seals. However, in the case of adopting these seals, the amount of leakage of the lubricating oil is large.

In view of the above, an object of the present invention is to provide an oil supply structure for a planetary gear device, the oil supply structure making it possible to use seal rings even in a case where the pressure of the lubricating oil is high or the peripheral speed is fast.

Solution to Problem

In order to solve the above-described problems, an oil supply structure for a planetary gear device according to the present invention includes: a planetary gear device including a tubular body that rotates together with a carrier that holds planetary gears, the tubular body including a lubricating oil introduction port formed therein; an annular body that slides against the tubular body, the annular body including a lubricating oil supply passage that communicates with the lubricating oil introduction port; a pair of seal rings attached to the tubular body or the annular body at both sides of the lubricating oil introduction port in an axial direction of the planetary gear device; bypass passages bypassing the pair of respective seal rings; and a pair of pressure reduction mechanisms disposed between the lubricating oil introduction port and the pair of seal rings or disposed outside the pair of seal rings, the pair of pressure reduction mechanisms each limiting a flow of lubricating oil between the tubular body and the annular body.

According to the above-described configuration, since the lubricating oil flows through the bypass passages, a difference in the pressure of the lubricating oil occurs between the upstream side and the downstream side of each seal ring, but the pressure difference is made sufficiently small by the function of the corresponding pressure reduction mechanism. Therefore, the PV value (P is the pressure difference between the upstream side and the downstream side of each seal ring) is small at the position of each seal ring. This makes it possible to use the seal rings even in a case where the pressure of the lubricating oil is high or the peripheral speed is fast. In addition, since a necessary flow amount in each bypass passage for allowing the corresponding pressure reduction mechanism to function is significantly small, the amount of leakage of the lubricating oil can be made small.

For example, each of the pair of pressure reduction mechanisms may be a gap seal or a labyrinth seal.

Alternatively, each of the pair of pressure reduction mechanisms may include: a secondary seal ring attached to an outer peripheral surface of the tubular body or an inner peripheral surface of the annular body; and a bypass passage bypassing the secondary seal ring.

For example, each of the pair of pressure reduction mechanisms may reduce a pressure of the lubricating oil to ½ or less.

For example, the tubular body may be provided at a radially inner end of the carrier, and the lubricating oil introduction port may be formed in an outer peripheral surface of the tubular body.

Advantageous Effects of Invention

The present invention makes it possible to use seal rings in an oil supply structure for a planetary gear device even in a case where the pressure of lubricating oil is high or the peripheral speed is fast.

DESCRIPTION OF EMBODIMENTS

Embodiment 1

Figure 1:
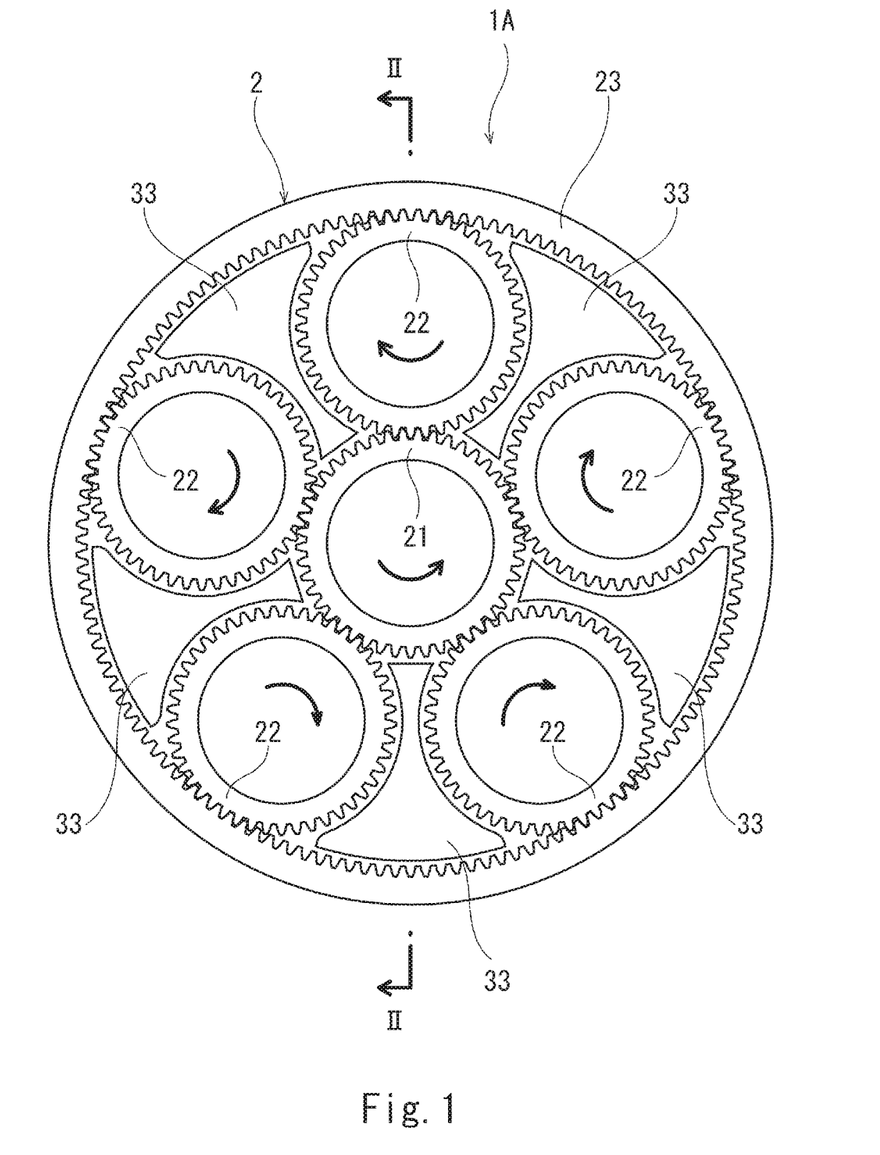
FIG. 1 shows a schematic configuration of a planetary gear device in an oil supply structure for the planetary gear device according to Embodiment 1 of the present invention.
Figure 2:
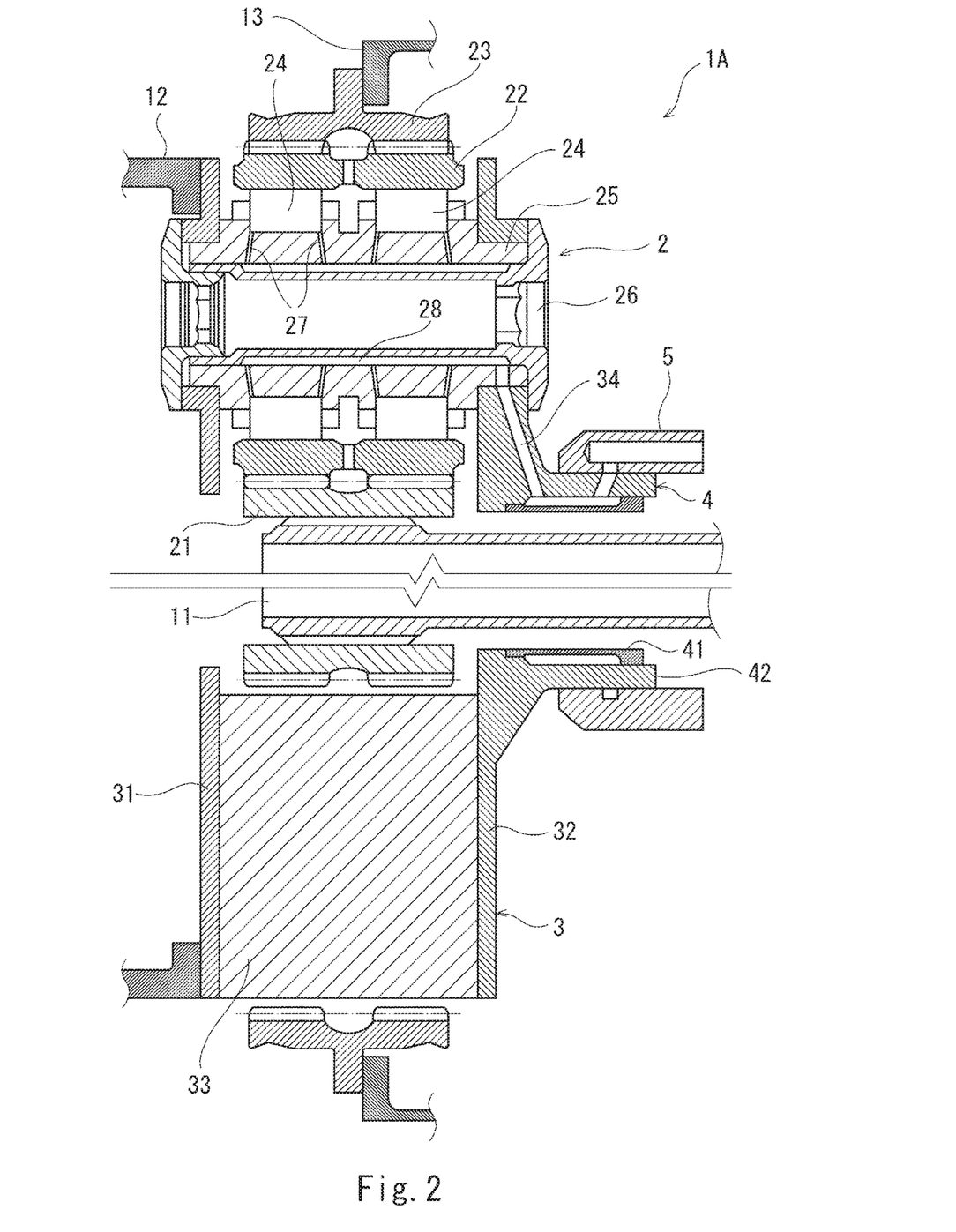
FIG. 2 is a sectional view taken along line II-II of FIG. 1.

FIG. 1 and FIG. 2 show an oil supply structure 1A for a planetary gear device according to Embodiment 1 of the present invention. The oil supply structure 1A includes a planetary gear device 2 and an annular body 5 fitted to a rotating part of the planetary gear device 2. It should be noted that FIG. 1 shows a schematic configuration of the planetary gear device 2, and components of the planetary gear device 2 other than gears 21 to 23 and baffles 33, which will be described below, are omitted in FIG. 1.

The planetary gear device 2 is coupled to a drive unit (not shown) (e.g., a gas turbine engine) via an input shaft 11. Hereinafter, for the sake of convenience of the description, the axial direction of the input shaft 11 is referred to as the front-rear direction (the drive unit side is referred to as rear or rearward, and the opposite side is referred to as front or forward).

The planetary gear device 2 includes: a sun gear 21 coupled to the input shaft 11; a plurality of (in the illustrated example, five) planetary gears 22 meshed with the sun gear 21; and a ring gear 23 meshed with the planetary gears 22. In the present embodiment, each of the gears 21 to 23 is a double helical gear. However, it will suffice if each of the gears 21 to 23 is a cylindrical gear. For example, each of the gears 21 to 23 may be a helical gear or spur gear with a single set of teeth.

The planetary gears 22 are held by a carrier 3, and the carrier 3 is coupled to an output shaft 12. The output shaft 12 extends forward from the carrier 3. For example, in a case where the aforementioned drive unit is an aircraft gas turbine engine, a fan disposed at the upstream side of the gas turbine engine may be rotated by the output shaft 12.

In the present embodiment, the ring gear 23 is coupled to a support 13, and rotation of the ring gear 23 is restricted. However, as an alternative, the ring gear 23 may be coupled to a secondary output shaft, and may rotate. In this case, the output shaft 12 may extend rearward from the carrier 3, and the secondary output shaft may extend forward from the ring gear 23.

To be more specific, the carrier 3 includes: a front plate 31 disposed forward of the planetary gears 22; and a back plate 32 disposed rearward of the planetary gears 22. The front plate 31 and the back plate 32 are coupled together via baffles 33, each of which is disposed between adjoining planetary gears 22. The baffles 33 may be separate members from the front plate 31 and the back plate 32, or may be integrally formed on either the front plate 31 or the back plate 32.

Each baffle 33 has a shape similar to that of a space surrounded by the adjoining planetary gears 22, the sun gear 21, and the ring gear 23. It should be noted that, instead of the baffles 33, simple-shaped pillars or walls may be provided. Although not illustrated, the baffles 33 or such alternative members may each be provided with a nozzle or a lubricating oil passage for jetting out lubricating oil to the sun gear 21 and the planetary gears 22.

Each planetary gear 22 is rotatably supported by a hollow planet shaft 25 via bearings 24. In the present embodiment, each bearing 24 includes rolling elements (in the present embodiment, rollers). However, as an alternative, the bearings 24 may be plain bearings. Both ends of the planet shaft 25 are fixed to the front plate 31 and the back plate 32 by fastening members 26 penetrating the inside of the planet shaft 25.

An oil storage chamber 28 is formed between the planet shaft 25 and the fastening members 26, and the planet shaft 25 is provided with oil supply holes 27 for leading the lubricating oil from the oil storage chamber 28 to the rolling elements of the bearings 24.

In the present embodiment, a lubricating oil passage 34, which communicates with the oil storage chamber 28, is formed in the back plate 32 of the carrier 3 and the planet shaft 25. In other words, the lubricating oil is supplied to the bearings 24 through the lubricating oil passage 34, the oil storage chamber 28, and the oil supply holes 27.

A tubular body 4 extending in the front-rear direction is provided at the radially inner end of the back plate 32. That is, the tubular body 4 rotates together with the carrier 3.

Figure 3:
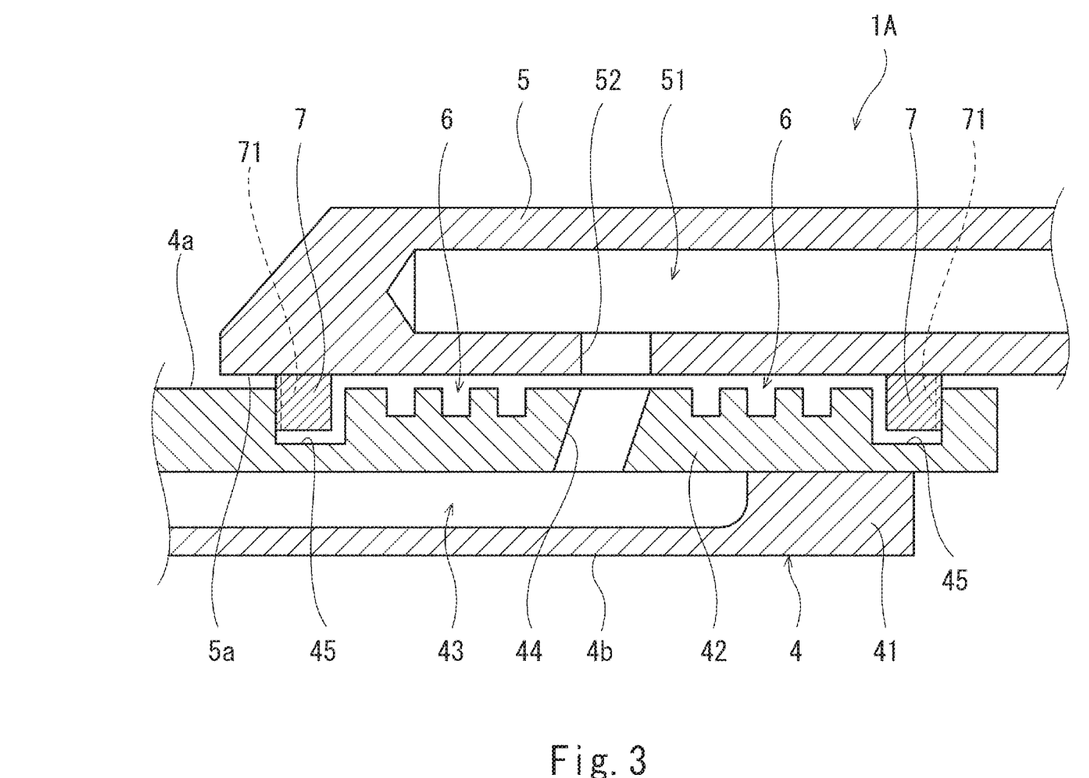
FIG. 3 is a sectional view of a tubular body and an annular body, the sectional view being a partially enlarged view of FIG. 2.

As shown in FIG. 3, in the present embodiment, the tubular body 4 includes: an outer wall 42, which forms an outer peripheral surface 4a of the tubular body 4; and an inner wall 41, which forms an inner peripheral surface 4b of the tubular body 4. The outer wall 42 is integrally formed on the back plate 32, and the inner wall 41 forms a lubricating oil introduction passage 43 between the inner wall 41 and the outer wall 42. The lubricating oil introduction passage 43 communicates with the aforementioned lubricating oil passage 34 (see FIG. 2). It should be noted that the tubular body 4 need not be divided into the outer wall 42 and the inner wall 41, but may be configured such that the outer wall 42 and the inner wall 41 are integrated together.

A lubricating oil introduction port 44, which communicates with the lubricating oil introduction passage 43, is formed in the outer peripheral surface 4a of the tubular body 4. In the present embodiment, the lubricating oil introduction port 44 is formed as an introduction hole extending diagonally relative to the radial direction of the tubular body 4. However, as an alternative, the introduction hole may extend in the radial direction of the tubular body 4.

In the present embodiment, the aforementioned annular body 5 is tubular and extends in the front-rear direction. An oil supply pipe (not shown) is connected to the rear end surface of the annular body 5. It should be noted that, although not illustrated, the annular body 5 may have such a sectional shape that the width in the radial direction is greater than the length in the axial direction. In such a case, the oil supply pipe may be connected to the outer peripheral surface of the annular body 5.

The annular body 5 includes an inner peripheral surface 5a, which slides against the outer peripheral surface 4a of the tubular body 4. A lubricating oil supply passage 51 extending in the front-rear direction is formed in the annular body 5. The lubricating oil supply passage 51 is open at the rear end surface of the annular body 5, and is connected to the aforementioned oil supply pipe. A groove 52 extending continuously in the circumferential direction is formed in the inner peripheral surface 5a of the annular body 5. The lubricating oil supply passage 51 communicates with the lubricating oil introduction port 44 through the groove 52.

It should be noted that, in a case where the oil supply pipe is connected to the outer peripheral surface of the annular body 5, the lubricating oil supply passage 51 may extend through the annular body 5 in the radial direction, and the groove 52 extending continuously in the circumferential direction may be formed in the outer peripheral surface 4a of the tubular body 4. In this case, the groove 52 and the aforementioned introduction hole formed in the tubular body 4 form the lubricating oil introduction port 44. If the tubular body 4 is configured such that the outer wall 42 and the inner wall 41 are integrated together and the groove 52 is formed in the outer peripheral surface 4a of the tubular body 4, the introduction hole may be eliminated.

In the axial direction, at both sides of the lubricating oil introduction port 44, a pair of seal rings 7 (not shown in FIG. 2 for the purpose of simplifying the drawing) is disposed. In the present embodiment, the seal rings 7 are attached to the tubular body 4. Specifically, a pair of grooves 45 each extending continuously in the circumferential direction is formed in the outer peripheral surface 4a of the tubular body 4. The seal rings 7 are inserted in these respective grooves 45. Each seal ring 7 is pressed by the pressure of the lubricating oil against the inner peripheral surface 5a of the annular body 5 and one side surface of the corresponding groove 45.

Alternatively, although not illustrated, a pair of grooves each extending continuously in the circumferential direction may be formed in the inner peripheral surface 5a of the annular body 5, and the seal rings 7 may be attached to the annular body 5 by inserting the seal rings 7 in these respective grooves.

The oil supply structure 1A of the present embodiment further includes bypass passages 71 bypassing the respective seal rings 7. In the present embodiment, a groove extending in the radial direction is formed in an end surface of each seal ring 7, the end surface being pressed against the side surface of the corresponding groove 45. These grooves in the end surfaces form the bypass passages 71.

Figure 4:
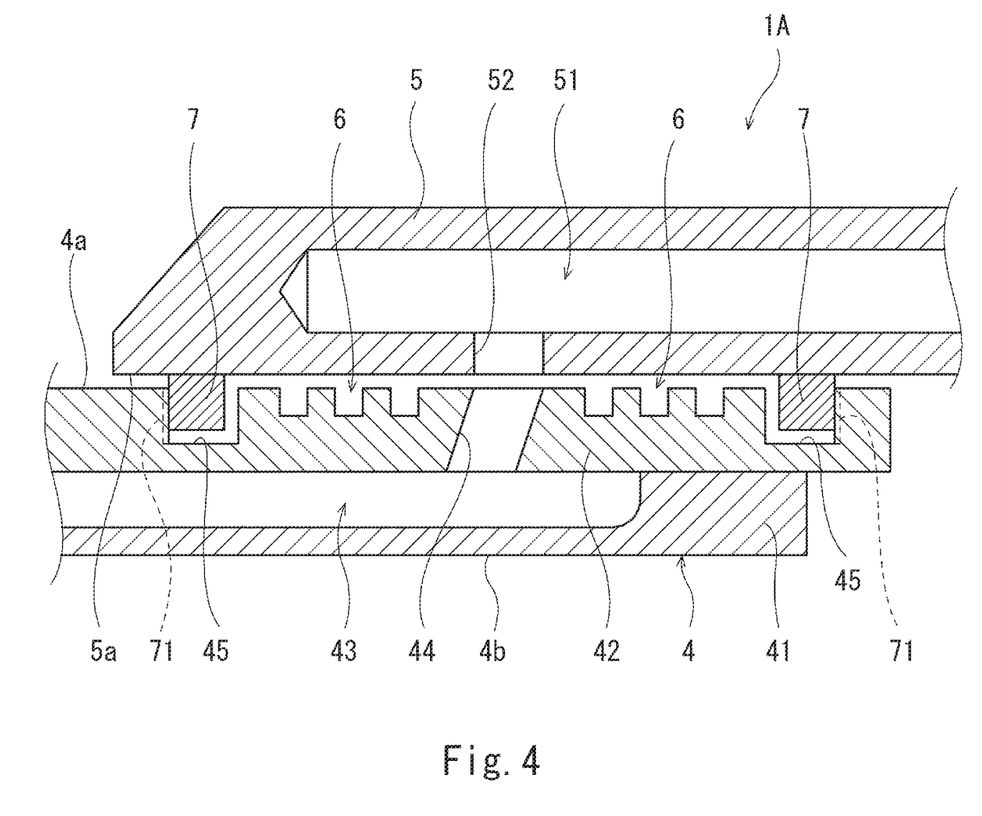
FIG. 4 is a sectional view of the tubular body and seal rings according to one variation.

Alternatively, as shown in FIG. 4, each bypass passage 71 may be configured as a groove that is formed in the side surface of the corresponding groove 45, against which the seal ring 7 is pressed. Further alternatively, each bypass passage 71 may be configured as a through-hole or a groove extending through the corresponding seal ring 7 in the axial direction (in the case of the groove, it may be formed not in the seal ring 7 but in the outer peripheral surface 4a of the tubular body 4 or the inner peripheral surface 5a of the annular body 5). As yet another alternative, each bypass passage 71 may be formed in the tubular body 4 or the annular body 5 as an internal passage.

Further, in the present embodiment, a pair of pressure reduction mechanisms 6 is provided between the lubricating oil introduction port 44 and the pair of seal rings 7 (in FIG. 2, the pressure reduction mechanisms 6 are not shown for the purpose of simplifying the drawing). Each pressure reduction mechanism 6 is configured to limit the flow of the lubricating oil between the tubular body 4 and the annular body 5. In other words, each pressure reduction mechanism 6 is configured to function as a restrictor. As a result, the pressure of the lubricating oil is reduced between the lubricating oil introduction port 44 and each seal ring 7. In the present embodiment, each pressure reduction mechanism 6 is a labyrinth seal that causes pressure loss due to flow change and/or swirl resulting from its cavities. In the illustrated example, the cavities of the labyrinth seals are formed in the outer peripheral surface 4a of the tubular body 4. However, as an alternative, the cavities of the labyrinth seals may be formed in the inner peripheral surface 5a of the annular body 5, or may be formed in both the outer peripheral surface 4a of the tubular body 4 and the inner peripheral surface 5a of the annular body 5. Further alternatively, each pressure reduction mechanism 6 may be merely a gap seal. For example, desirably, each pressure reduction mechanism 6 is configured to reduce the pressure of the lubricating oil to ½ or less.

As described above, in the oil supply structure 1A of the present embodiment, since the lubricating oil flows through the bypass passages 71, a difference in the pressure of the lubricating oil occurs between the upstream side and the downstream side of each seal ring 7, but the pressure difference is made sufficiently small by the function of the corresponding pressure reduction mechanism 6. Therefore, the PV value (P is the pressure difference between the upstream side and the downstream side of each seal ring 7) is small at the position of each seal ring 7. This makes it possible to use the seal rings 7 even in a case where the pressure of the lubricating oil is high or the peripheral speed is fast. In addition, since a necessary flow amount in each bypass passage 71 for allowing the corresponding pressure reduction mechanism 6 to function is significantly small, the amount of leakage of the lubricating oil can be made small.

Embodiment 2

Figure 5:
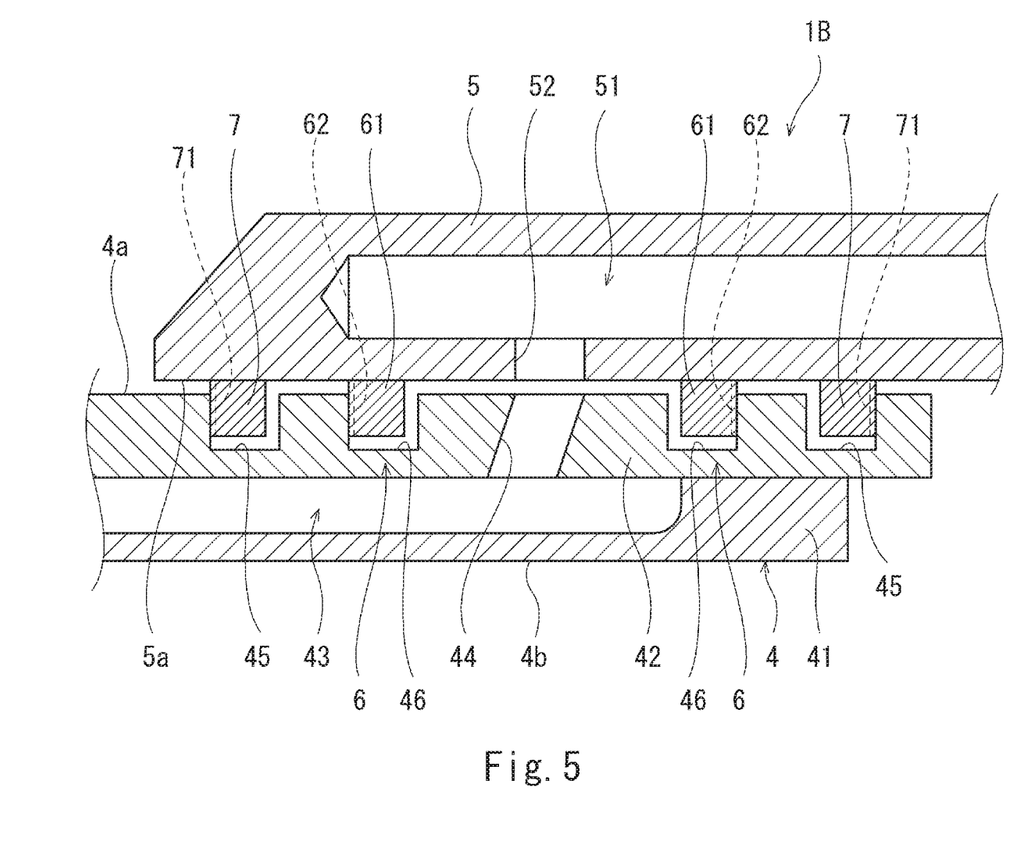
FIG. 5 is a sectional view of the tubular body and the annular body in an oil supply structure according to Embodiment 2 of the present invention.

Next, an oil supply structure 1B for a planetary gear device according to Embodiment 2 of the present invention is described with reference to FIG. 5. It should be noted that, in the present embodiment and the following Embodiment 3, the same components as those described in Embodiment 1 are denoted by the same reference signs as those used in Embodiment 1, and repeating the same descriptions is avoided.

In the present embodiment, each pressure reduction mechanism 6 includes: a secondary seal ring 61 attached to the tubular body 4; and a bypass passage 62 bypassing the secondary seal ring 61. Specifically, a pair of grooves 46 each extending continuously in the circumferential direction is formed in the outer peripheral surface 4a of the tubular body 4, and the seal rings 61 are inserted in these respective grooves 45. Each seal ring 61 is pressed by the pressure of the lubricating oil against the inner peripheral surface 5a of the annular body 5 and one side surface of the corresponding groove 46. It should be noted that, similar to the case of the seal rings 7 described in Embodiment 1, the secondary seal rings 61 may be attached to the annular body 5.

In the present embodiment, a groove extending in the radial direction is formed in an end surface of each seal ring 61, the end surface being pressed against the side surface of the corresponding groove 46. These grooves in the end surfaces form the bypass passages 62. Alternatively, each bypass passage 62 may be configured as a groove that is formed in the side surface of the corresponding groove 46, against which the seal ring 61 is pressed. Further alternatively, each bypass passage 62 may be configured as a through-hole or a groove extending through the corresponding seal ring 61 in the axial direction (in the case of the groove, it may be formed not in the seal ring 7 but in the outer peripheral surface 4a of the tubular body 4 or the inner peripheral surface 5a of the annular body 5). As yet another alternative, each bypass passage 62 may be formed in the tubular body 4 or the annular body 5 as an internal passage.

Also in the present embodiment, the pressure difference of the lubricating oil between the upstream side and the downstream side of each seal ring 7 can be made sufficiently small by the function of the corresponding pressure reduction mechanism 6. This makes it possible to obtain the same advantageous effects as those obtained in Embodiment 1.

Embodiment 3

Figure 6:
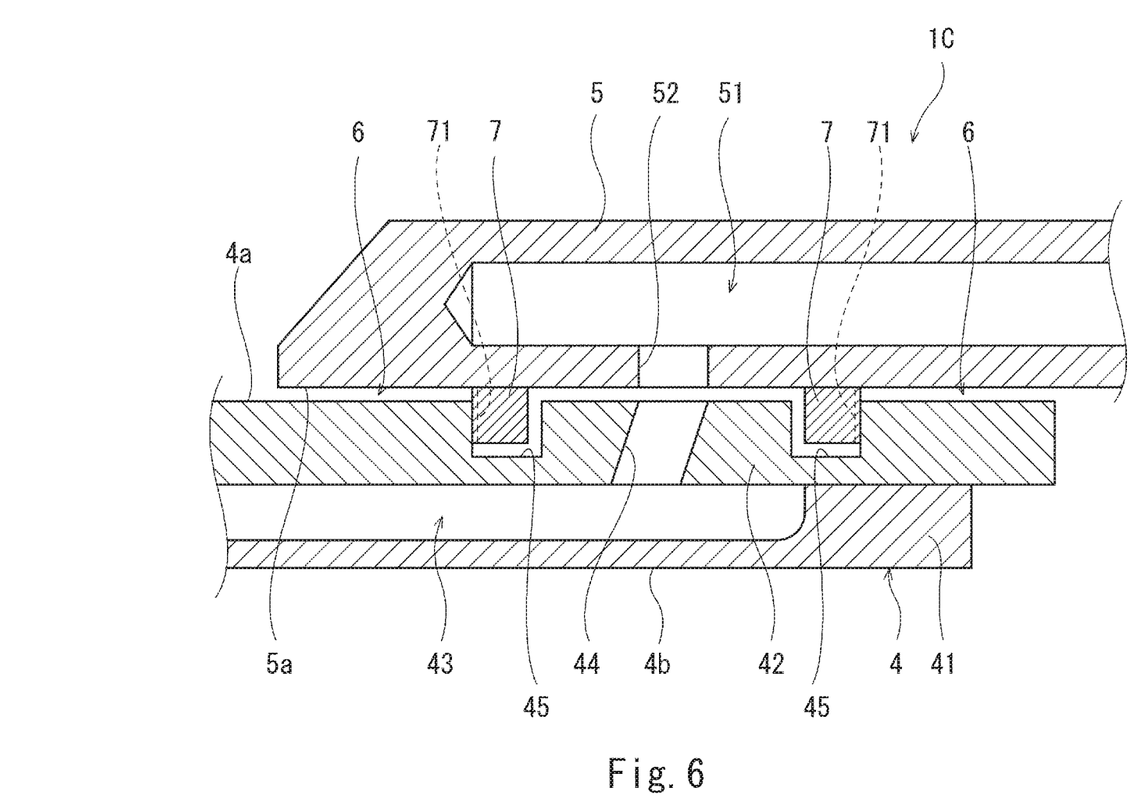
FIG. 6 is a sectional view of the tubular body and the annular body in an oil supply structure according to Embodiment 3 of the present invention.

Next, with reference to FIG. 6, an oil supply structure 1C for a planetary gear device according to Embodiment 3 of the present invention is described. In the present embodiment, a pair of pressure reduction mechanisms 6, each of which is a gap seal, is disposed outside the pair of seal rings 7. Also in the present embodiment, the pressure difference of the lubricating oil between the upstream side and the downstream side of each seal ring 7 can be made sufficiently small by the function of the corresponding pressure reduction mechanism 6 (in the present embodiment, the pressure at the downstream side of the seal rings 7 is kept high by the pressure reduction mechanisms 6). This makes it possible to obtain the same advantageous effects as those obtained in Embodiment 1.

It should be noted that each pressure reduction mechanism 6 may be a labyrinth seal. Looking at Embodiment 2 from the same viewpoint as the present embodiment, not the inner seal rings 61 and bypass passages 62 but the outer seal rings 7 and bypass passages 71 can be regarded as the pressure reduction mechanisms 6.

Other Embodiments

The present invention is not limited to the above-described Embodiments 1 to 3. Various modifications can be made without departing from the spirit of the present invention.

For example, the tubular body 4 and the annular body 5 may be disposed forward of the carrier 3, and the lubricating oil passage 34 may be formed in the front plate 31 of the carrier 3.

Unlike Embodiments 1 to 3, the annular body 5 may be inserted in the tubular body 4; the lubricating oil introduction port 44 may be formed in the inner peripheral surface 4b of the tubular body 4; and the inner peripheral surface 4b of the tubular body 4 and the outer peripheral surface of the annular body may slide against each other. Alternatively, an end surface of the tubular body 4 and an end surface of the annular body 5 may be butted together, and the lubricating oil introduction port 44 may be formed in the end surface of the tubular body 4.

REFERENCE SIGNS LIST 1A to 1C oil supply structure
2 planetary gear device
22 planetary gear
3 carrier
4 tubular body
4a outer peripheral surface
44 lubricating oil introduction port
5 annular body
5a inner peripheral surface
51 lubricating oil supply passage
6 pressure reduction mechanism
61 secondary seal ring
62 bypass passage
7 seal ring
71 bypass passage

The invention claimed is:

1. An oil supply structure for a planetary gear device, the oil supply structure comprising:
   a planetary gear device including a tubular body that rotates together with a carrier that holds planetary gears, the tubular body including a lubricating oil introduction port formed therein;
   an annular body that slides against the tubular body, the annular body including a lubricating oil supply passage that communicates with the lubricating oil introduction port;
   a pair of seal rings attached to the tubular body or the annular body at both sides of the lubricating oil introduction port in an axial direction of the planetary gear device;
   bypass passages bypassing the pair of respective seal rings to permit the lubricating oil to bypass the pair of respective seal rings; and
   a pair of pressure reduction mechanisms disposed between the lubricating oil introduction port and the pair of seal rings or disposed outside the pair of seal rings, the pair of pressure reduction mechanisms each limiting a flow of lubricating oil between the tubular body and the annular body through the bypass passages,
   wherein each of the pair of pressure reduction mechanisms reduces a pressure of the lubricating oil to ½ or less of the pressure before reduction.

2. The oil supply structure for a planetary gear device according to claim 1, wherein
   each of the pair of pressure reduction mechanisms is a gap seal or a labyrinth seal.

3. The oil supply structure for a planetary gear device according to claim 2, wherein
   the tubular body is provided at a radially inner end of the carrier, and
   the lubricating oil introduction port is formed in an outer peripheral surface of the tubular body.

4. The oil supply structure for a planetary gear device according to claim 1, wherein
   each of the pair of pressure reduction mechanisms includes:
      a secondary seal ring attached to the tubular body or the annular body; and
      a bypass passage bypassing the secondary seal ring.

5. The oil supply structure for a planetary gear device according to claim 4, wherein
   the tubular body is provided at a radially inner end of the carrier, and
   the lubricating oil introduction port is formed in an outer peripheral surface of the tubular body.

6. The oil supply structure for a planetary gear device according to claim 1, wherein
   the tubular body is provided at a radially inner end of the carrier, and
   the lubricating oil introduction port is formed in an outer peripheral surface of the tubular body.

7. The oil supply structure for a planetary gear device according to claim 1, wherein
   the tubular body is provided at a radially inner end of the carrier, and
   the lubricating oil introduction port is formed in an outer peripheral surface of the tubular body.

8. An oil supply structure for a planetary gear device, the oil supply structure comprising:
   a planetary gear device including a tubular body that rotates together with a carrier that holds planetary gears, the tubular body including a lubricating oil introduction port formed therein;

an annular body that slides against the tubular body, the annular body including a lubricating oil supply passage that communicates with the lubricating oil introduction port;

a pair of seal rings attached to the tubular body or the annular body at both sides of the lubricating oil introduction port in an axial direction of the planetary gear device;

bypass passages bypassing the pair of respective seal rings to permit the lubricating oil to bypass the pair of respective seal rings; and a pair of pressure reduction mechanisms disposed between the lubricating oil introduction port and the pair of seal rings, the pair of pressure reduction mechanisms each limiting a flow of lubricating oil between the tubular body and the annular body through the bypass passages.

9. The oil supply structure for a planetary gear device according to claim 8, wherein
each of the pair of pressure reduction mechanisms is a gap seal or a labyrinth seal.

10. The oil supply structure for a planetary gear device according to claim 9, wherein
each of the pair of pressure reduction mechanisms reduces a pressure of the lubricating oil to ½ or less of the pressure before reduction.

11. The oil supply structure for a planetary gear device according to claim 9, wherein
the tubular body is provided at a radially inner end of the carrier, and
the lubricating oil introduction port is formed in an outer peripheral surface of the tubular body.

12. The oil supply structure for a planetary gear device according to claim 8, wherein
each of the pair of pressure reduction mechanisms includes:
a secondary seal ring attached to the tubular body or the annular body; and
a bypass passage bypassing the secondary seal ring.

13. The oil supply structure for a planetary gear device according to claim 12, wherein
each of the pair of pressure reduction mechanisms reduces a pressure of the lubricating oil to ½ or less of the pressure before reduction.

14. The oil supply structure for a planetary gear device according to claim 12, wherein
the tubular body is provided at a radially inner end of the carrier, and
the lubricating oil introduction port is formed in an outer peripheral surface of the tubular body.

15. The oil supply structure for a planetary gear device according to claim 8, wherein
each of the pair of pressure reduction mechanisms reduces a pressure of the lubricating oil to ½ or less of the pressure before reduction.

16. The oil supply structure for a planetary gear device according to claim 15, wherein
the tubular body is provided at a radially inner end of the carrier, and
the lubricating oil introduction port is formed in an outer peripheral surface of the tubular body.

17. The oil supply structure for a planetary gear device according to claim 8, wherein
the tubular body is provided at a radially inner end of the carrier, and
the lubricating oil introduction port is formed in an outer peripheral surface of the tubular body.

* * * * *